May 17, 1966 F. M. ALTMAN 3,251,091
RECOVERY OF CRAB MEAT
Filed Sept. 21, 1962 8 Sheets-Sheet 1
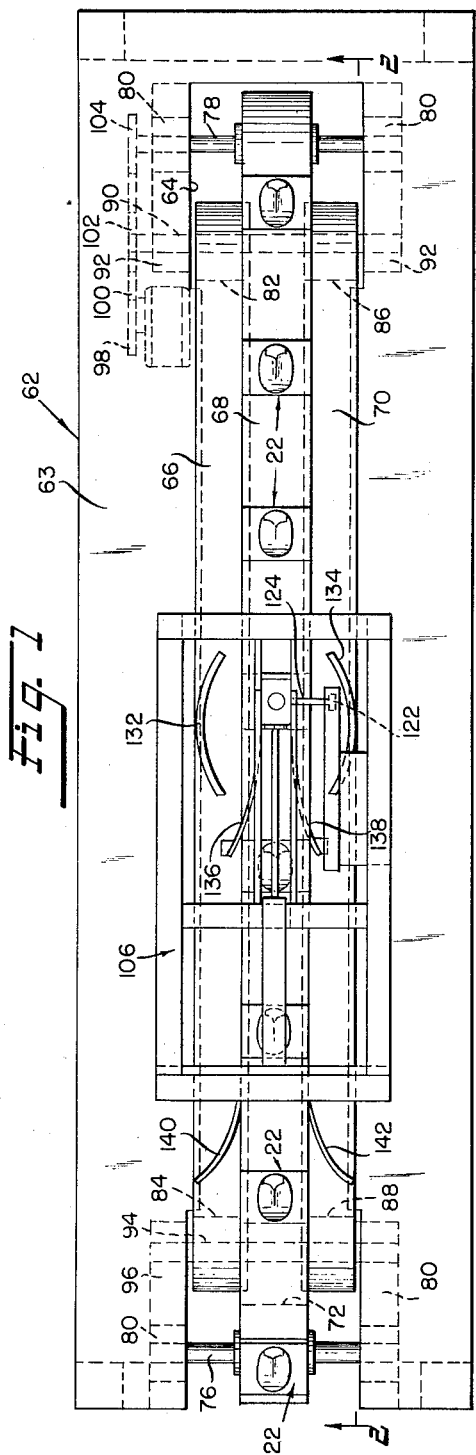
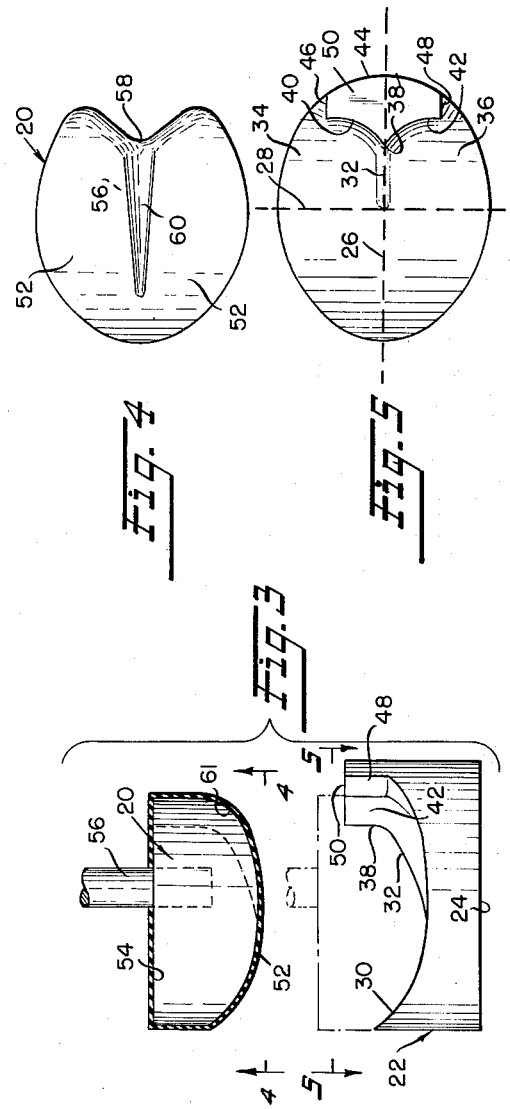
INVENTOR
Francis M. Altman
BY
ATTORNEYS

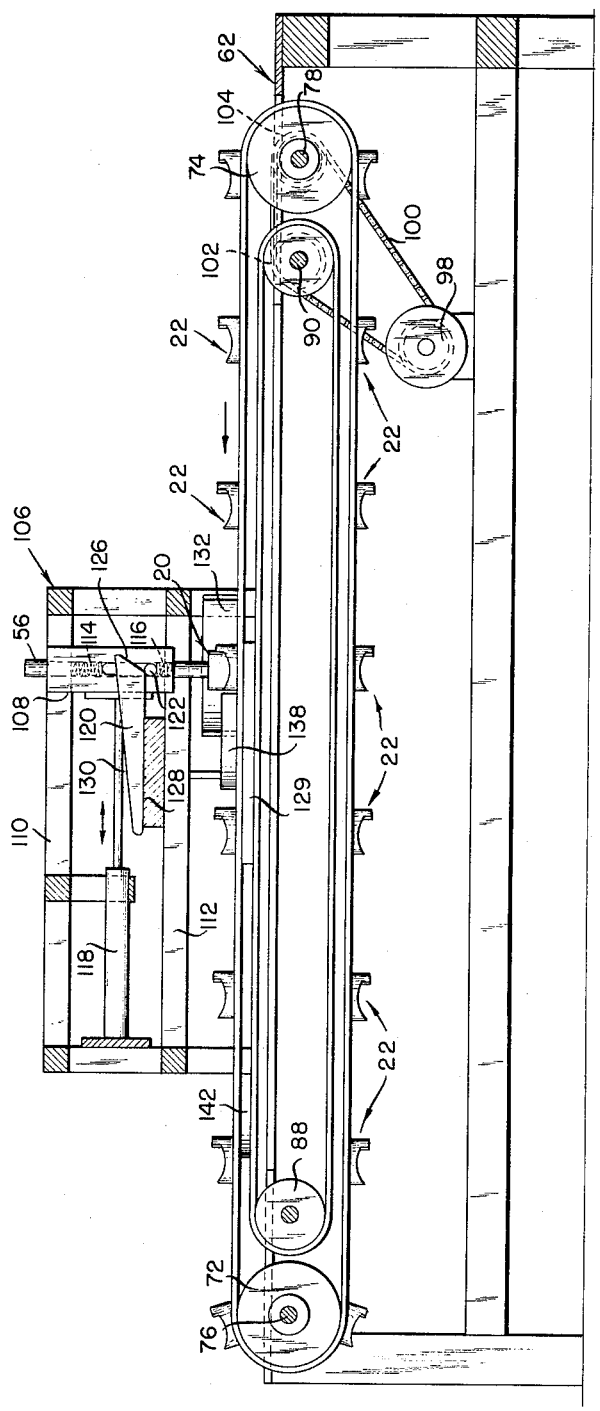

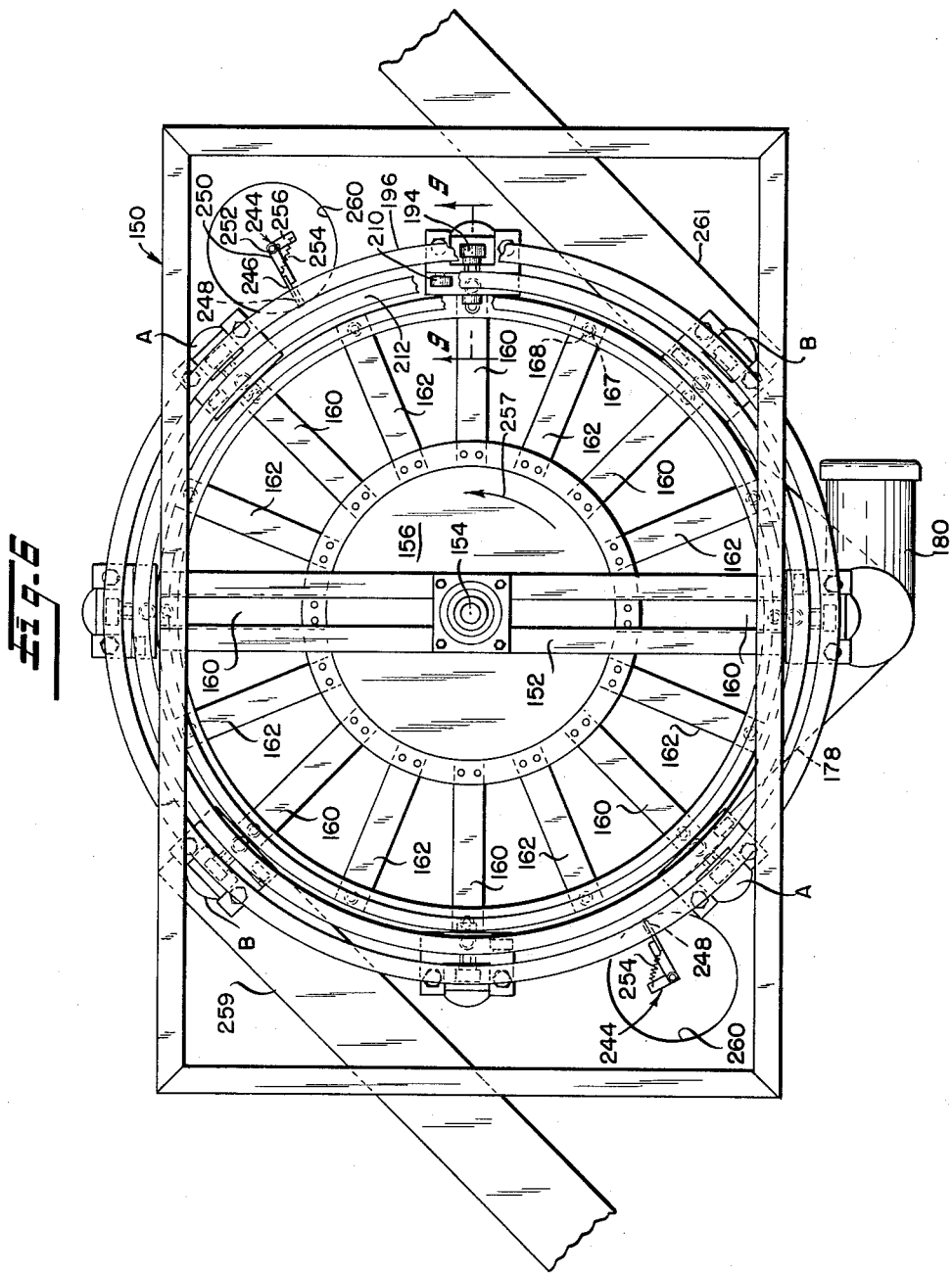

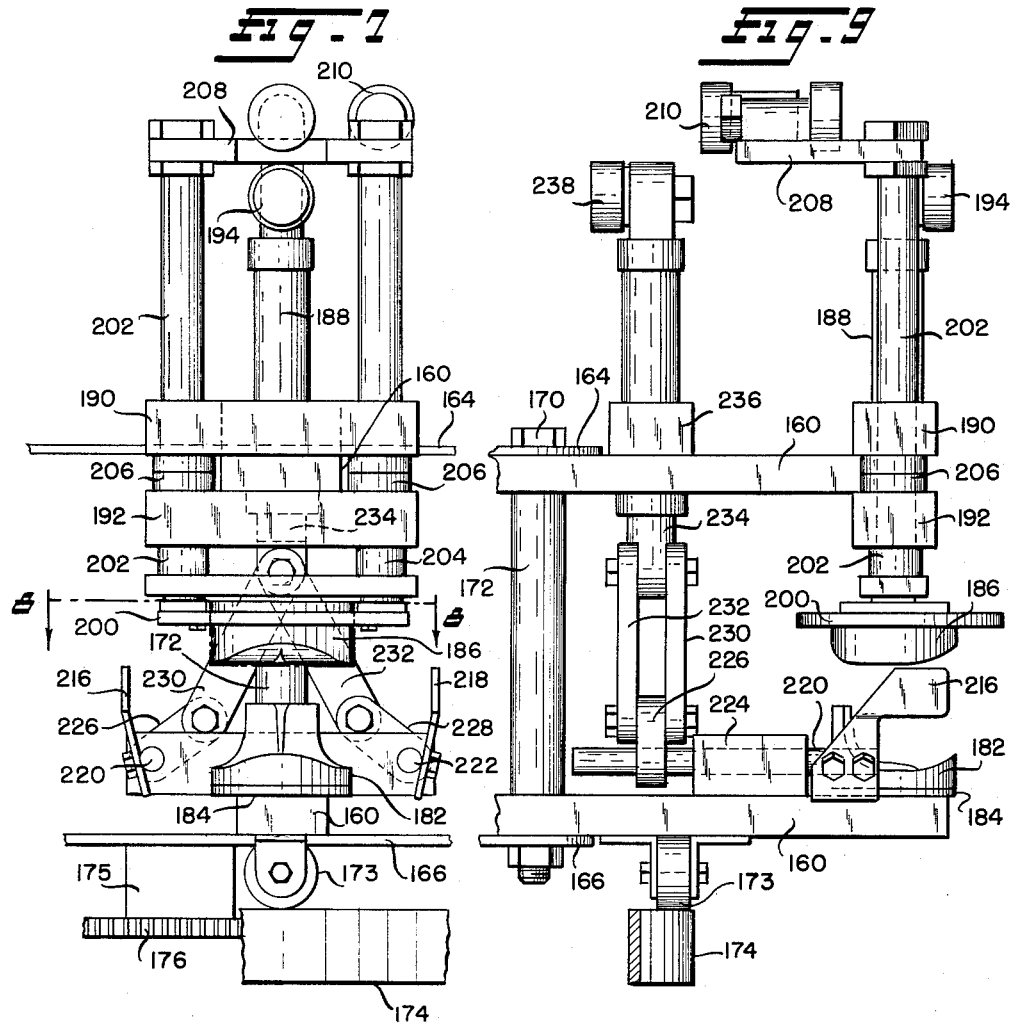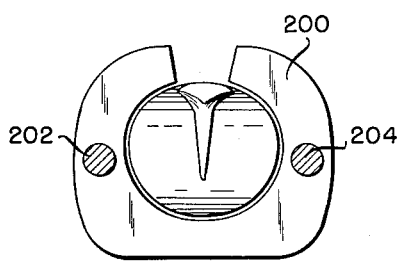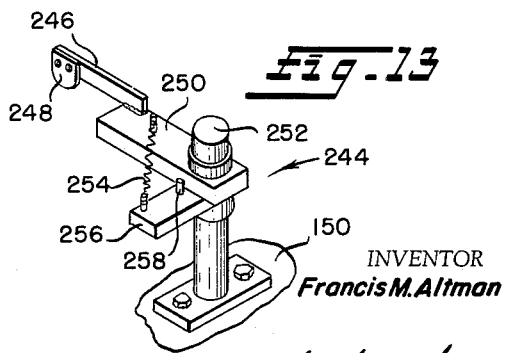

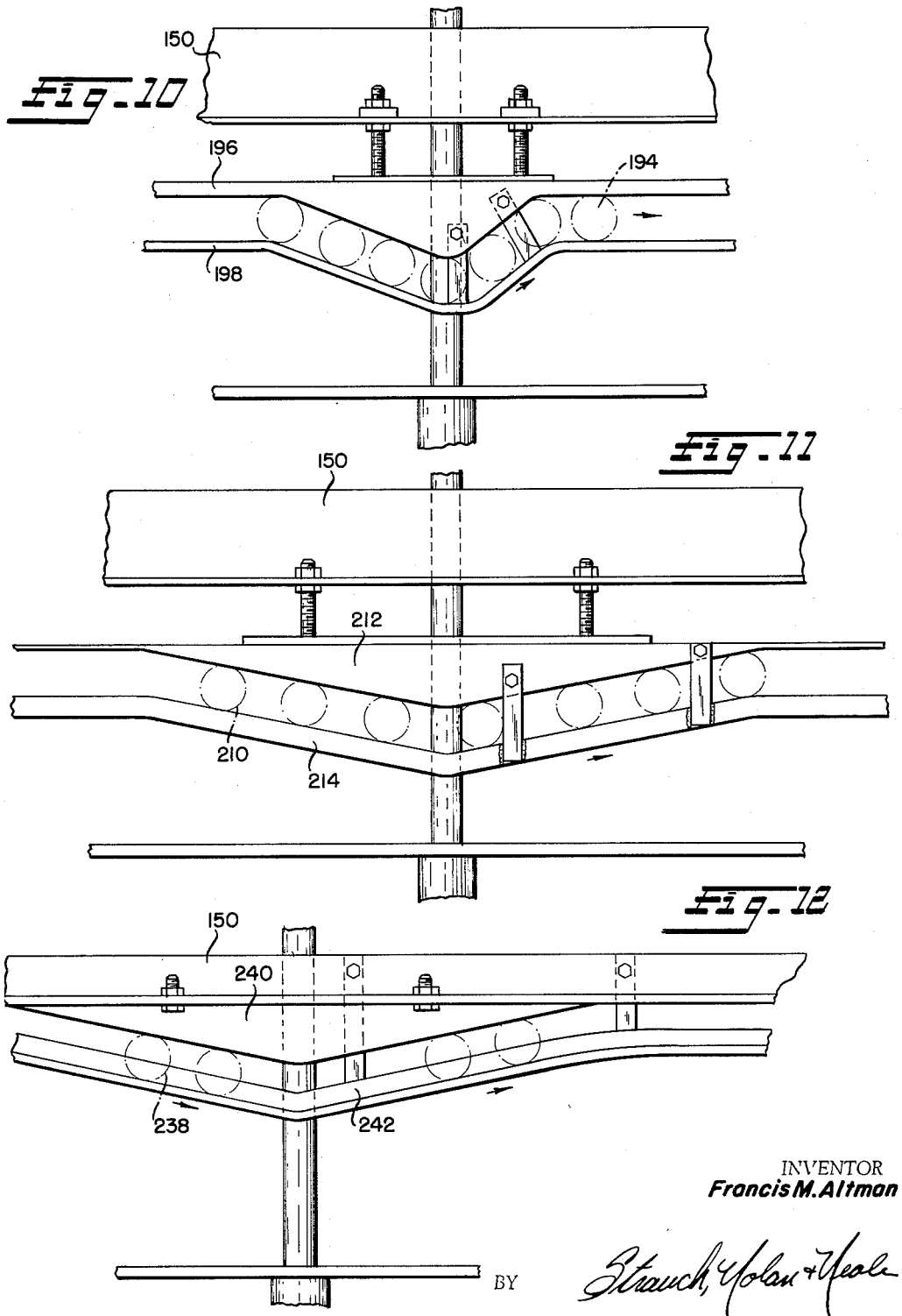

May 17, 1966   F. M. ALTMAN   3,251,091
RECOVERY OF CRAB MEAT
Filed Sept. 21, 1962   8 Sheets-Sheet 6
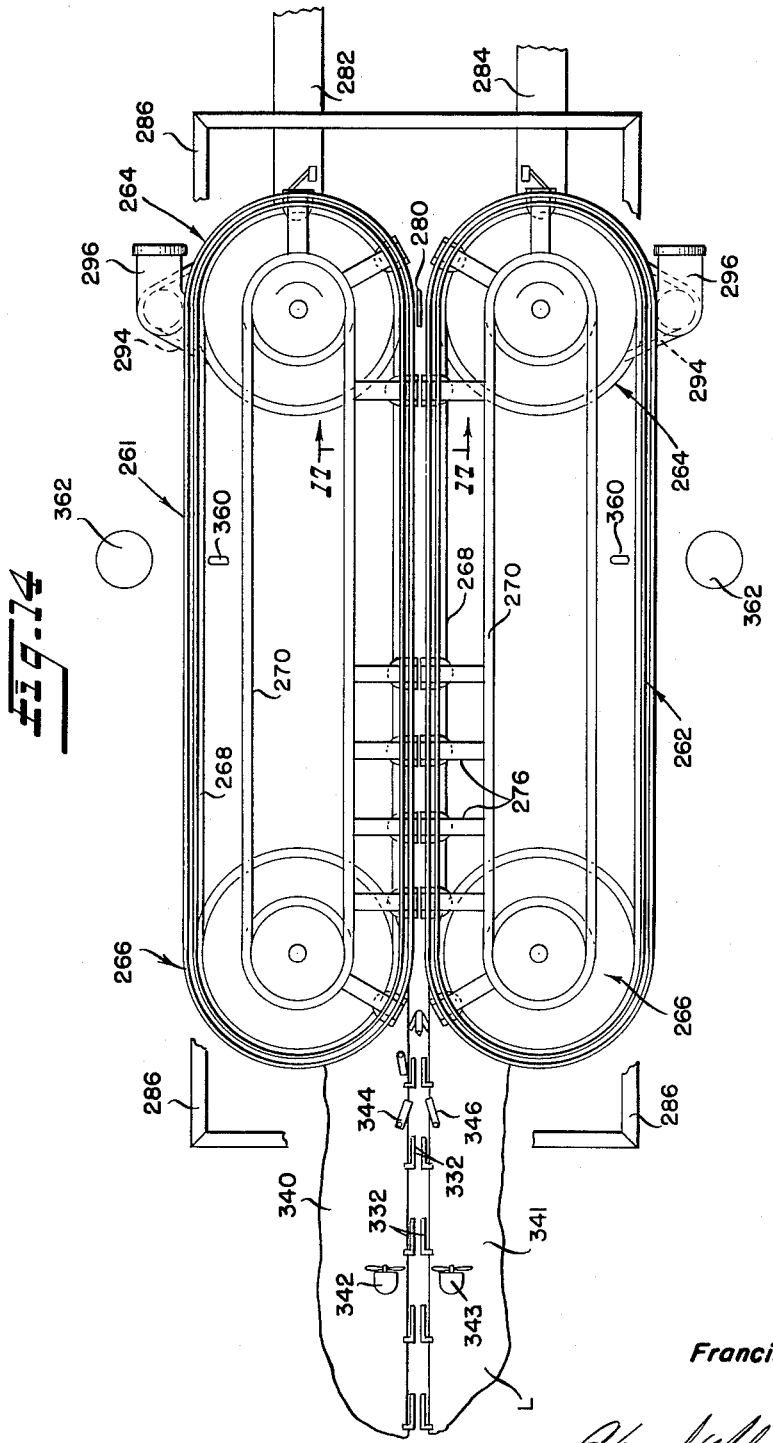
INVENTOR
*Francis M. Altman*
BY *Strauch, Nolan & Yule*
ATTORNEYS May 17, 1966
F. M. ALTMAN
3,251,091
RECOVERY OF CRAB MEAT
Filed Sept. 21, 1962
8 Sheets-Sheet 7
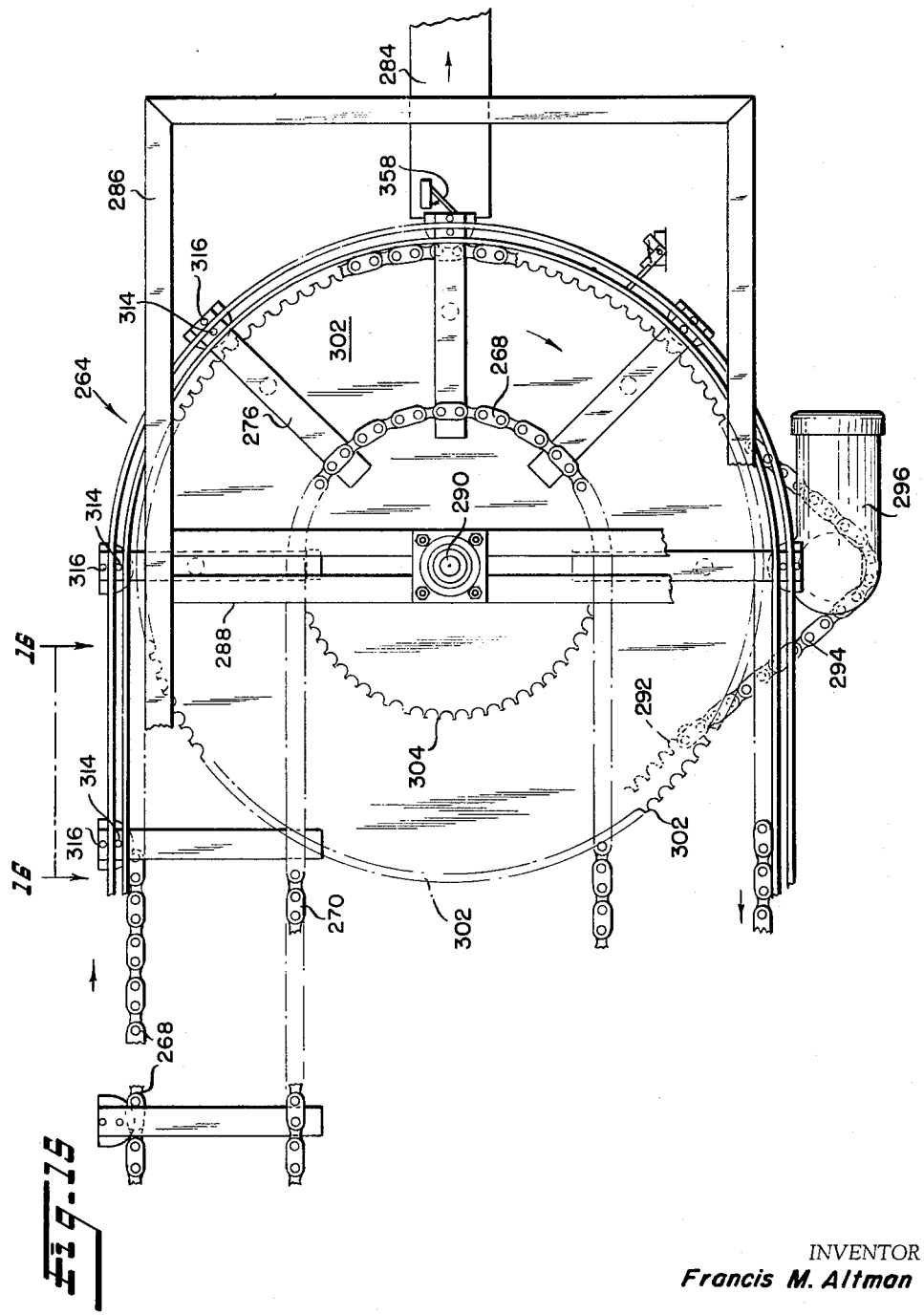
INVENTOR
Francis M. Altman
BY
ATTORNEYS May 17, 1966 F. M. ALTMAN 3,251,091
RECOVERY OF CRAB MEAT Filed Sept. 21, 1962 8 Sheets-Sheet 8

INVENTOR
Francis M. Altman
BY
Strauch, Nolan & Neale
ATTORNEYS

United States Patent Office 3,251,091
Patented May 17, 1966

3,251,091
RECOVERY OF CRAB MEAT
Francis M. Altman, % Bay Packing Co., Oriental, N.C.
Filed Sept. 21, 1962, Ser. No. 225,435
8 Claims. (Cl. 17—2)

This application is a continuation-in-part of Serial No. 132,438, filed August 18, 1961, for "Recovery of Crab Meat," now abandoned.

This invention relates to methods and apparatus for recovering meat from crustaceans, particular edible crabs.

The removal of meat from crabs for packing is a troublesome process because the carcass of the crab is divided into many cells by thin, bony walls. Many proposals have been made to effect this operation by machine techniques. For example, it has been proposed to cut the carcass and subject it to centrifugal force to remove the meat. It has also been proposed to freeze and shatter the crab and subsequently separate the meat from the bone by a flotation process. Proposals have also been made to remove the meat from a prepared crab carcass by blowing the meat out of the carcass by high velocity jets or by forcing the meat out of the carcass by rotating brushes.

The wide variety of these and other prior proposals is indicative of the difficulty of the problem presented. The lack of success of these proposals, which is generally due to their high cost, low efficiency or poor product quality is evidenced by the fact that hand picking continues to be the dominant method of recovering crab meat despite the obvious disadvantages of low speed, high cost and possible contamination of the product associated with a purely manual operation.

With these considerations in mind, it is the principal purpose and object of the present invention to provide improved methods and apparatus for recovering crab meat which are considerably faster, more efficient and less costly than systems now in use and which, for the first time, permit the elimination of the relatively slow and expensive manual operations which are now practically universal in the industry.

In accordance with the present invention, this object and other objects are attained by the apparatus of the present invention in its presently preferred form which performs all operations except the preliminary cooking operation necessary to separate the crab meat from the carcass in a continuous process.

In this form the present invention has the additional advantage of eliminating completely the requirement for removal of the legs or fins of the crab which is a necessary preparatory step in the manual picking of crab meat and in the operation of all known prior apparatus.

In another form, the apparatus of the present invention is effective to recover the meat from the crab carcass which has first been prepared by conventional cooking and cleaning operations performed manually or by commercially available apparatus.

In all forms of the invention, the final removal of the crab meat from the carcass is effected by squeezing the carcass in a novel manner between mold structures of novel construction which, when brought together under pressure, are effective to extrude substantially all of the meat from the carcass while retaining the desired character of the meat and leaving the complex bone structure of the carcass substantially intact. Thus the final product is substantially free of bone which materially enhances its commercial value.

In accordance with the present invention the squeezing operation can be performed by manual manipulation of the novel squeezing apparatus or in a high speed semi or fully automatic machine. Since the squeezing operation can be performed in a matter of seconds and the crab meat needs no further treatment before being packed, the recovery of crab meat is effected at a rate not approached by prior systems.

It is accordingly a further object of the present invention to provide novel method and apparatus for recovery of crab meat by subjecting a crab carcass to a pressure squeezing action which extrudes the meat from the carcass while leaving the bone structure of the carcass substantially intact to produce a product of excellent quality and substantially free of bone.

It is also an object of the present invention to provide novel mold apparatus for squeezing a prepared crab carcass to extrude the meat therefrom.

It is an additional object of the present invention to provide novel apparatus which rapidly and automatically performs all steps incident to the removal of crab meat from a pre-cooked crab.

It is a further object of the present invention to provide improved apparatus which permits the recovery of crab meat either by manual manipulation of relatively simple physical structure or by semi or fully automatic apparatus thus providing apparatus suitable for use either in small plants or in larger plants where the economic advantages of high speed mechanized operation can be more fully realized.

Additional objects and advantages of the present invention will become apparent as the description proceeds in connection with the accompanying drawings in which:

FIGURE 1 is a top plan view of a semi-automatic apparatus constructed in accordance with one aspect of the present invention;

FIGURE 2 is a vertical section taken along line 2—2 of FIGURE 1;

FIGURE 3 is an enlarged side elevation partly in section of two mold components forming a part of the apparatus of FIGURES 1 and 2;

FIGURE 4 is a bottom elevation of the upper mold member looking in the direction of arrows 4—4 of FIGURE 3;

FIGURE 5 is a top elevation of a lower mold element looking in the direction of arrows 5—5 of FIGURE 3;

FIGURE 6 is a top plan view of another form of the crab recovery apparatus constructed in accordance with the present invention;

FIGURE 7 is an enlarged fragmentary view showing a mold and carrier assembly utilized in the apparatus of FIGURE 6;

FIGURE 8 is a horizontal section taken along line 8—8 of FIGURE 7;

FIGURE 9 is an enlarged fragmentary section taken along line 9—9 of FIGURE 6 illustrating further details of construction;

FIGURES 10, 11 and 12 are enlarged fragmentary views of the principal operating cams for the mechanism of FIGURE 6;

FIGURE 13 is an enlarged perspective view of one element of the mechanism of FIGURE 6;

FIGURE 14 is a semi-diagrammatic top plan view of another and presently preferred form of the apparatus constructed in accordance with the present invention;

FIGURE 15 is an enlarged top plan view of a portion of the apparatus shown in FIGURE 14;

Figure 16:
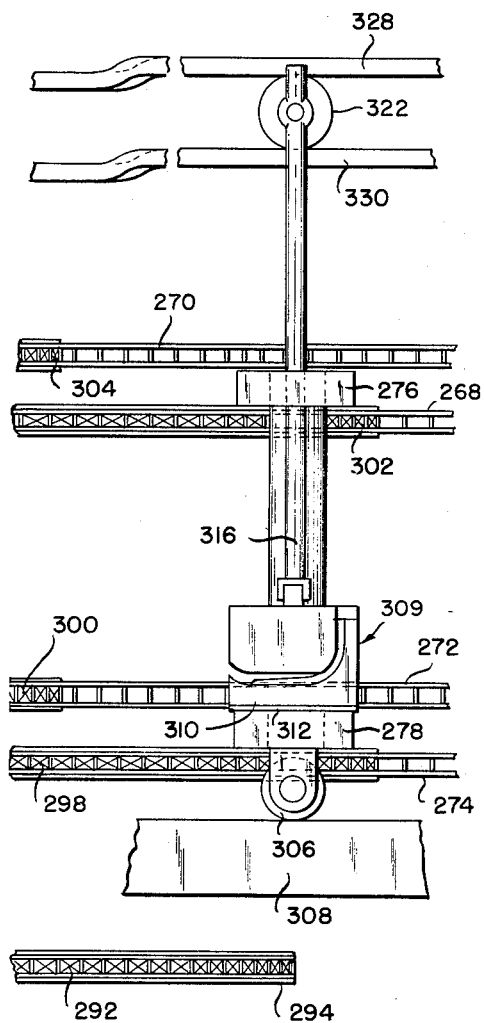
FIGURE 16 is an enlarged fragmentary view of a portion of the apparatus of FIGURE 15 looking in the direction of arrows 16—16 on FIGURE 15.

Referring now more particularly to the embodiment of the invention shown in FIGURES 1-5 of the drawings, this apparatus is primarily concerned with the treatment of the crab carcass which has been prepared by conventional preliminary operations. The live crabs are first cooked in conventional apparatus. The legs, claws, fins, knuckles, carapace and viscera are then removed leaving what is often referred to as a core. In small packing plants, the cleaning operation will be effected manually. In large scale operations, the cleaning operation may be performed with commercially available apparatus, for example apparatus of the type shown in United States Patent No. 2,771,631. The core is generally circular in form and has a convex bottom surface. The backbone which extends centrally from the rear edge of the carcass toward the front edge, forms an upwardly projecting center ridge. The crab meat is contained in a relatively complex bony cell structure, the cells extending transversely of the backbone and being open at their outer ends after removal of the knuckles.

The meat is extracted from the core or carcass by squeezing it between two mold elements 20 and 22 of novel construction illustrated in FIGURES 3, 4 and 5 to which detailed reference will now be made.

The lower mold assembly shown in FIGURES 3 and 5 is of generally oval form in plan view and preferably has a flat bottom wall 24. The upper surface of the mold is generally of concave form and is formed symmetrically about a central longitudinal axis 26 and asymmetrically about a transverse axis 28. The portion of the upper surface to the left of the axis 28, as viewed in FIGURES 3 and 5, is formed with a smooth curve of decreasing radius terminating in a relatively steep curved wall portion 30. Formed centrally of the right-hand side of the mold, as viewed in FIGURES 3 and 5, is a relatively narrow upwardly projecting ridge 32, the side walls of which merge smoothly into the curved surface portions 34 and 36 at the opposite sides of the ridge 32. The ridge 32 is of gradually increasing height from left to right, as viewed in FIGURES 3 and 5, and at one end merges smoothly into the main upper face of the mold and at its opposite end merges smoothly into a vertical wall portion 38.

Leading away from the vertical peak of the ridge 38 are smoothly curved surfaces 40 and 42 which are essentially vertical and which merge smoothly at their lower ends into the curved surface portions 34 and 36, respectively. The surfaces 38, 40 and 42 form the front walls of an upwardly extending projection 44, having flat vertical side walls 46 and 48 and a flat top wall 50, the outer surface of the projection 44 being formed by the oval outer wall of the mold.

The upper mold 20 which is formed to mate with the lower mold 22 is of heart-shaped form, as shown in FIGURE 4, and is provided with a generally convex lower surface 52 conforming to the upper concave surface of the mold 22. For convenience, the top mold 20 may have a flat wall 54 through which an operating shaft 56 extends into the body of the mold. The shaft 56 may be cast into the mold or may be threaded into the mold or secured by other suitable means. At its right-hand end, as viewed in FIGURES 3 and 4, the top mold 20 is formed with a recess 58 which conforms closely to the wall portions 40 and 42 of the projection 44. At its lower end the recess 58 merges smoothly into a recess 60 which conforms closely with the contour of the ridge 32. However, as can be seen from a comparison of FIGURES 4 and 5, the recess 60 is relatively elongated with respect to the ridge 32.

When the upper mold is fitted into the lower mold, as shown in dotted lines in the lower portion of FIGURE 3, the two molds conform closely and are in surface engagement except for the portion of the recess 60 which extends beyond the end of the ridge 32.

The outline and configuration of the two molds corresponds generally to the outline and configuration of the prepared crab core or carcass and the dimensions of the mold are such as to accommodate a crab of the largest size normally encountered. While the molds may be made of any material having suitable rigidity and durability, they are preferably made of stainless steel because of the durability and corrosion resistance of this material.

While it is important that the action of the molds be positive in order to develop the necessary squeezing pressure, nevertheless it is also desirable that the molds have a certain degree of resilience to assure uniform action on crabs of varying size and thickness. This resiliency can be obtained in a number of ways, for example by covering the upper mold with a thin layer of rubber as shown at 61. Alternately, the entire upper mold can be made of relatively hard rubber or other suitable relatively rigid but slightly yieldable material. This same result can also be achieved by mounting one of the molds, preferably the lower mold, on a yieldable base, for example a thin layer of relatively hard rubber. If the molds are fabricated of rubber or covered with rubber, one of the molds is relieved slightly in the area of the wall portion 30 to avoid cutting the rubber when the molds are urged together under pressure.

In operation the molds are separated and the prepared crab carcass is positioned right-side up on the lower mold, with the backbone of the carcass in vertical alignment with the ridge 32 and the recess 60. The crab carcasses, regardless of size, are positioned rearwardly with their rearward edges in engagement with the surfaces 40 and 42. The ridge 32 projects into the slight cavity left in the carcass upon removal of the bony flap commonly called the key or apron. The upper mold is then pressed firmly onto the lower mold, i.e. the upper mold is moved from the full line position of FIGURE 3 to the dotted line position. Upon the application of pressure to the upper mold, the crab meat is extruded smoothly and freely through the openings at the outer edge of the carcass provided by removal of the knuckles. Because of the unique configuration of the molds, the squeezing action acting on the crab carcass is effective first on the central portion of the carcass and progresses toward the outer edges of the carcass. As stated above, the cells of the carcass in which the meat is contained extend generally transversely of the backbone, that is transversely of the ridge 32 and the recess 60 toward the unobstructed side edges of the mold. However, during application of the squeezing process to the carcass, some of the meat will tend to travel longitudinally of the mold. Extrusion of the meat in this direction is effectively prevented by the raised surface 30 at one end of the mold and the upwardly extending surfaces of the projection 44 at the opposite end of the mold. Actual experience has demonstrated that the outwardly progressive squeezing action of the molds is substantially facilitated by the utilization of the rubber cover 61 or an equivalent slightly resilient mold block.

The final disposition of the meat at the end of the squeezing operation depends to some extent upon the rapidity with which the two molds are brought together. If the build-up of pressure at the faces of the molds is relatively gradual, the meat will be extruded in relatively fine flaky form and will be deposited at the outer edges of the molds where it can be scraped off manually or by suitable automatic apparatus. If the application of pressure is relatively rapid, i.e. the molds are brought together to produce a relatively sharp impact, the meat is extruded in larger chunks and is expelled from the crab carcass with sufficient force to carry it beyond the edges of the molds. If this type of action is utilized, a fence or guard may be provided to enclose the area into which the crab meat is thrown. Since crab meat in chunk form has a higher commercial value, it is preferred that the molds be brought together rather rapidly with sufficient impact to produce relatively large chunks of meat which are thrown clear of the molds. This also facilitates subsequent gathering of crab meat.

Actual experience has shown that regardless of the degree of rapidity with which the pressure is applied, approximately 95% of the crab meat will be removed from the carcass which closely approximates the degree of removal achieved in the tedious and expensive hand picking process now in widespread use. Thus, in a fraction of a second, the present invention accomplishes a result which in the past could be achieved only by several minutes of semi-skilled manual labor. Recovery of crab meat in accordance with the present invention has a further substantial advantage over hand picking or prior mechanical methods in that the crab meat is delivered by the apparatus substantially entirely free of bone. At the conclusion of the squeezing process the upper mold is removed and the bony structure of the crab carcass remains on the lower mold. It is common knowledge that 30 to 50 small pieces of bone may be found in a small can of flaked or special crab meat which has been hand picked. In a similar quantity of crab meat recovered in accordance with the present invention, the bone content will be limited to possibly 2 or 3 pieces. Thus the present invention not only significantly reduces the cost of the meat recovery process but also substantially enhances the commercial value of the recovered meat.

Many different types of apparatus may be utilized for bringing the molds in suitable pressure contact. For example, for small scale operations the molds may be incorporated in a device quite similar to the well-known orange juice squeezer. Alternately, the molds can be operated by any conventional die operating mechanism equipped with a suitable pneumatic or hydraulic power apparatus.

If the operation at greater speed and higher capacity is desired, the crab meat recovery may be effected by semi or fully automatic apparatus, different forms of such apparatus being shown in FIGURES 1 and 2, 6–13 and 14–18.

The apparatus shown in FIGURES 1 and 2 to which detailed reference will now be made, comprises a generally rectangular stand assembly indicated generally at 62 having a float top plate 63 provided with an elongated central opening 64 to accommodate three conveyor belts 66, 68 and 70. The central belt 68 is supported on drums 72 and 74 carried by respective shafts 76 and 78 rotatably supported in suitable bearing assemblies 80 in the stand 62. The side belts 66 and 70 are supported on drums 82 and 84 and 86 and 88 respectively. The drums 82 and 86 are supported on a common shaft 90 mounted in suitable bearing structure 92 carried by the stand, while the drums 84 and 88 are supported by a common shaft 94 rotatably supported by suitable bearings 96 carried by the stand. The respective drums are so arranged as to support the side belts 66 and 70 slightly below the main belt 68, the inner edges of the belts 66 and 70 being underneath the outer edges of the central belt 68. The belts are preferably driven in synchronism by a motor 98 through a chain 100 which extends around sprockets 102 and 104 mounted on the respective shafts 90 and 78.

A plurality of the lower molds 22 are secured by suitable means in uniformly spaced relation to the central belt 68, the molds being arranged with their central axes 26 parallel with the axes of the belt and the projections 44 facing away from the direction of motion of the upper reach of the belt which is from right to left as viewed in FIGURE 2. The molds are arranged in the manner to retain the crab carcasses in engagement with the front surfaces of the projections.

These molds are adapted to cooperate with a single upper mold 20 which is supported in a superstructure indicated generally at 106 rigidly secured to the stand 62 centrally thereof. The operating shaft 56 associated with the mold is received for vertical sliding movement in a slide block 108 mounted for horizontal sliding movement in guide ways 110 and 112 carried by the superstructure 106. The mold 20 is normally held in its raised position by upper and lower centering springs 114 and 116 carried by the guide block 108. The guide block 108 is moved horizontally in the superstructure 106 by a hydraulic or pneumatic piston-cylinder assembly 118. The operation of the piston 118 is controlled in synchronism with the conveyor belts 66, 68 and 70 by suitable means not shown, and its speed is adjusted so the travel of the slide block 108 to the left is effected at the same speed as the passage of the molds 22. Preferably the return stroke of the piston is effected at an accelerated rate to permit the positioning of the molds 22 with minimum spacing on the belt 68. The leftward stroke of the piston can be initiated for example by a switch interposed in an appropriate position in a path of the molds 22 as they approach the work station.

Vertical movement of the mold 20 is effected by a cam 120 carried by the superstructure in the path of a roller 122 carried by a pin 124 rigidly secured to the shaft 56 and projecting through a slot in the side wall of the slide block 108. The cam is formed with a relatively steep cam surface 126 which causes rapid downward movement of the mold 20 against the mold 22 as the piston 118 draws the slide block 108 to the left as viewed in FIGURE 2. A flat dwell portion 128 on the cam holds the mold 20 in firm pressure engagement with the mold 22 for a predetermined period of time. A suitable roller type support assembly 129 is mounted on the stand 62 beneath the belt 68 in the region below the cam 120 to furnish firm support for the molds 22 as they are engaged by the mold 20.

When the roller 122 reaches the left end of the cam dwell surface 128, it is urged upwardly by the lower centering spring 116. On the return stroke, the roller 122 engages the upper surface 130 of the cam and the shaft 56 is further elevated compressing the upper centering spring 114. The springs 114 and 116 are so arranged that when the roller 122 passes off the end of the cam surface 130, the shaft 56 is lowered slightly to dispose the roller slightly below the corner formed between the cam surfaces 126 and 130.

Preferably the cam 120 is so designed as to bring the upper mold into engagement with the lower mold with a relatively sharp impact which throws most of the crab meat outwardly away from the mold. Accordingly, arcuate guide fences 132 and 134 are mounted on the stand 62 or the superstructure 106 to prevent the crab meat from passing outward beyond the edges of the two side belts 66 and 70.

Any crab meat adhering to the sides of the molds is removed by resilient stripper fingers 136 and 138 carried by the superstructure 106. These stripper fingers effectively remove the meat from the molds and from the conveyor belt 68 and transfer it to the belts 66 and 70. The crab meat thus deposited on the belts 66 and 70 travels from the working station to additional stripper fingers 140 and 142 suitably supported on the stand 62. These stripper fingers scrape the crab meat off the upper surface of the belts 66 and 70 for delivery to containers positioned under the fingers. It will be noted that the crab meat travels an appreciable distance on the belts 66 and 68 before being removed by the stripper fingers 140 and 142 to provide an inspection station to permit the removal of any small quantities of bone which may be included in the meat. The carcasses remain in the molds until the molds reach the drum 72. As the molds pass over these drums, the carcasses fall into a suitable waste container for convenient disposal.

After the prepared crab carcasses are properly positioned manually on the lower molds 22, the remainder of the operation is conducted automatically, the crab meat being delivered to the containers ready for packing and shipment and the carcasses from which the meat is extracted being delivered either to a container or a further conveyor belt for any convenient method of disposal.

While a cam and piston arrangement has been disclosed as the operating means for the upper mold 22, it will be understood that movement of the mold can be effected through other conventional mechanisms which satisfy the requirement of bringing the upper mold into engagement with the lower mold with a relatively sharp impact, maintaining the two molds in pressure engagement until the meat has been stripped from the sides of the mold and then returning the upper mold to its initial position for a repeat cycle. While it has been found that the utilization of a solid upper mold, particularly one having a resilient operating surface provides the required progressive squeezing action which first acts on the central portion of the crab and then progresses outwardly toward the outer edges of the crab, this action may be obtained by other means.

The action can also be accomplished by constructing the upper mold with a plurality of separate sections arranged for relative vertical sliding movement with the center sections being brought into contact with the upper surface of the crab carcass in the region of the backbone and the additional sliding sections being brought sequentially into contact with the next adjacent outer portions of the crab carcass. However, it has been found that the one piece upper mold described above is efficient in operation and inexpensive to construct and maintain.

The apparatus of FIGURES 6–13 to which reference will now be made is much the same in operation as the previously described embodiment. However, it is considerably more compact and considerably faster in operation and thus better suited for larger scale operations.

Whereas in the previously described embodiment, the molds are carried in a substantially straight line path and each mold assembly is operative on one crab carcass in each cycle of the mechanism, the apparatus of FIGURES 6–13 is so arranged that the molds are carried in a circular path and in each revolution of the molds they operate on two crab carcasses.

All of the operating components of the apparatus of FIGURES 6–13 are mounted on a generally rectangular frame structure indicated generally at 150. The frame is provided with upper and lower cross members 152 (one shown) which rotatably support the upper and lower ends of a vertical shaft 154. Keyed or otherwise secured to the shaft 154 are upper and lower circular discs 156 (one shown) to the peripheries of which are secured upper and lower sets of long and short spokes 160 and 162, respectively. Identical upper and lower rings 164 and 166 are secured to the outer ends of the short spokes 162 by bolts 167 which also extend through tubular spacers 168 positioned between the upper and lower spokes 162. Similar bolts 170 and spacers 172 are provided to connect the upper and lower long spokes 160 and to maintain them in proper spaced relation. Rollers 173 carried by each of the lower spokes 160 ride along tracks 174 carried by the frame 150 to further support the spokes.

Suitably secured to and spaced from the undersurface of the lower ring 166 by a plurality of blocks 175 is a drive sprocket 176 which is driven by a chain 178 in turn driven by a commercially available motor and gear unit 180 suitably secured to the frame 150. Lower mold assemblies 182 of essentially the same configuration as the lower mold assemblies 22 illustrated in FIGURES 3 and 5 are mounted on the outer ends of each of the lower longer spokes 160. Preferably a resilient pad 184 is interposed between each of the lower molds 182 and its supporting arm 160 to permit the mechanism to yield under pressure to accommodate crab carcasses of differing size.

Corresponding upper mold assemblies 186 of essentially the same configuration as the upper mold assemblies 20 of FIGURES 3 and 4 are carried by the lower ends of vertical shafts 188 which slidably extend through the outer ends of the upper long spokes 160 and through aligned openings in upper and lower blocks 190 and 192 suitably secured to the outer ends of the spokes 160. The vertical position of the shaft 188 and thus the upper mold half 186 is controlled by a cam follower of the upper mold 186 which is guided by a pair of spaced cam tracks 196 and 198 carried by the frame structure 150. Since the cam follower 194 is confined between the cam tracks 196 and 198, the position of the upper mold 186 is positively controlled at all times.

A horseshoe shaped scraper assembly 200, shown separately in FIGURE 8, which is preferably a steel reinforced rubber unit, substantially encircles the mold assemblies and when lowered around the mold assemblies removes the extruded meat from the sides of the molds. The scraper assembly 200 is carried by the lower ends of a pair of opposed shafts 202 and 204 which extend upwardly through aligned openings in the blocks 192 and 190 and spacer assemblies 206 positioned between the blocks and are united at their upper ends by a cross bar 208.

Mounted on a rear extension of the bar 208 is a cam follower roller 210 which is confined throughout the cycle of the mechanism between upper and lower cam tracks 212 and 214 carried by the frame structure 150.

The mechanism of this form of the invention also includes apparatus for preconditioning the crab carcass and centering it on the lower mold assembly 182. This mechanism comprises a pair of arms 216 and 218 associated with each mold assembly. The arms are carried by the outer ends of shafts 220 and 222, respectively, rotatably carried by a cross bar 224 mounted on the outer end of the lower spoke 160 inwardly of the lower mold half 182. The projecting inner ends of the shafts 220 and 222 are connected to identical toggle links 226 and 228, the opposite ends of which are pivotally connected to pairs of additional links 230 and 232. The upper ends of the links 230 and 232 are pivotally connected to the lower end of a shaft 234 slidably received in a bearing 236 carried by the upper spokes 160. The upper end of the shaft 234 carries a cam follower roller 238 which is guided during the entire cycle of operation between upper and lower cam tracks 240 and 242 carried by the frame structure 150.

Assemblies indicated generally at 244 are shown separately in FIGURE 13 and are mounted at opposite corners of the frame structure 150 and are effective to remove the carcasses from the lower mold assemblies after the meat has been recovered.

These assemblies each comprise a finger 246 having a rubber tab 248 adapted to ride across the upper surface of the lower mold assembly 182. The fingers 246 are each carried by blocks 250 rotatably supported on the upper end of a post 252 mounted on the frame structure 150. The fingers 246 are biased to the position shown in FIGURE 13 by a tension spring 254 carried by a block 256 non-rotatably carried by the post 252, the spring urging the block 250 against the stop 258. As shown in FIGURE 6 the assemblies 244 are positioned over chutes 260 which receive the displaced crab carcasses and carry them to any convenient point of disposal.

As stated above, the mechanism of FIGURES 6–13 is double acting in that in each revolution of the shaft 154 two crab carcasses may be treated. For example, when the mechanism is operated, the cam tracks are so arranged that each of the mold assemblies will occupy the open or loading position shown in FIGURES 7 and 9 twice in each revolution of the mechanism, the loading positions being shown at points A in FIGURE 6. When the mechanism is in this position, the pre-prepared crab carcasses or cores are manually positioned on the lower mold halves 182. As the mechanism is then rotated in a counterclockwise direction as shown by the arrow 257, each of the mold assemblies and their related components will be operated through identical cycles at the opposite sides of the center line of the mechanism.

More specifically, as the mold assemblies are moved from the position shown in a counterclockwise direction, the shaft 234 is moved downwardly to urge the opposite members 216 and 218 into contact with the crab carcass with sufficient force to break a portion of the bone structure of the crab to facilitate subsequent removal of the meat. The shaft 234 is then moved upwardly by the cam track 242 to restore the flippers 216 and 218 to the position shown in FIGURE 7. In the subsequent movement of the apparatus the upper mold assembly 186 is lowered and extrudes the crab meat from the carcass in the same manner as that described in connection with the embodiment of FIGURES 1-5. The upper mold is held in its lower position while the wiper or scraper assembly 200 is lowered to firmly but gently remove the meat from the sides of the compressed mold assembly. This latter operation is preferably performed when the mold assembly reaches the positions B shown in FIGURE 6 at which time the mold assemblies are disposed directly above conveyor belts 259 and 261 which carry the crab meat to packing apparatus not shown. The length of the conveyor belts is such that inspection of the crab meat can be readily effected.

In the continuing rotation of the apparatus the scraper 200 and the upper mold assembly 186 are lifted to restore the components of the apparatus to the position shown in FIGURES 7 and 9, this position being achieved before the assemblies reach the stripper tabs 248 which remove the carcasses from the lower mold assemblies. The mold assemblies then occupy a position substantially 180° removed from their initial loading position where they may each be again re-loaded. Actual experience has shown that the mechanism may be operated at speeds as high as 8 r.p.m. which permits the apparatus to handle as high as 128 crabs a minute.

Preferably the entire mechanism is enclosed in a sheet metal housing (not shown) to protect the operators against possible injury, to protect the crab meat against contamination and to facilitate washing the apparatus at the completion of the run.

The embodiment of FIGURES 14-18, which will now be described in detail is capable of higher rates of production than either of the embodiments previously described and thus is preferred for most large-scale commercial operations. In this form of the invention the molds previously described are used in a slightly different manner. More specifically, the upper mold halves and the lower mold halves are each split vertically and the mold parts of each side of the dividing line are carried by synchronized but separate identical conveyor mechanisms. The conveyor mechanisms are indicated generally at 261 and 262 in FIGURE 14. Each comprises rotatable disc assemblies 264 and 266, the general construction of which is quite similar to the single rotating disc mechanism as shown in FIGURE 6. The rotatable assemblies 264 and 266 are connected by two upper chains 268 and 270 and two lower chains 272 and 274 which carry a series of upper arms 276 and a series of lower arms 278 on which the mold assemblies are supported. The two conveyor assemblies 261 and 262 are placed in side by side relation and cause the mold assemblies to travel in an elliptical path and are so arranged and synchronized that the mold halves during a portion of their travel will be brought together to form in effect a complete mold as used in the previously described embodiment of the apparatus. When the molds are so brought together, the crab carcass from which the back apron and inedible portions have been removed by means to be described is placed on the lower mold and the upper molds are lowered sufficiently to hold the crab in fixed position. While so held, the crab carcass is split from front to rear by any suitable type of blade or cutting mechanism, indicated at 280, which passes between the mold sections which are separated laterally along a central vertical plane sufficiently to accommodate the blade. Then, as the mold sections are carried apart, for example around the respective disc assemblies 264, the upper mold portions are lowered to squeeze the crab meat out through the now open center of the crab carcass for delivery to conveyor belts 282 and 284.

Figure 17:
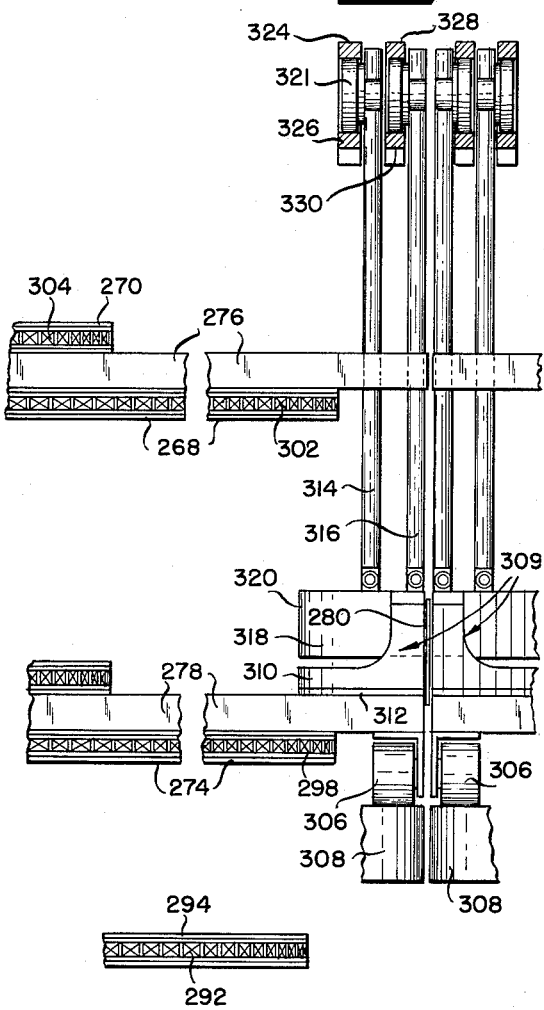
FIGURE 17 is a transverse vertical section taken along line 17—17 of FIGURE 14.
Figure 18:
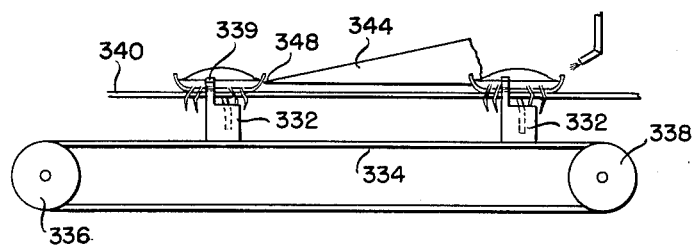
FIGURE 18 is a diagrammatic side elevation of a portion of the apparatus of FIGURE 14.

Referring more specifically to FIGURES 15, 16 and 17, each of the rotatable disc assemblies is mounted in a frame structure indicated generally at 286 having upper and lower cross bars 288 (one shown) which rotatably support the upper and lower ends of a shaft 290. Adjacent its lower end, the shaft 290 carries a drive sprocket 292 driven through a chain 294 from a conventional motor gear operator 296. Above the drive sprocket 292, the sprocket 298 carrying chain 274 and sprocket 300 carrying chain 272 are mounted in spaced relation. Adjacent its upper end shaft 290 carries sprockets 302 and 304 carrying chains 268 and 270, respectively. The spacing between the sprockets 298 and 300 and between the sprockets 302 and 304 is slightly greater than the thickness of the arms 278 and 276, respectively, which are carried by the chains and are not attached to the sprockets. Thus when the arms 276 and 278 are in the region of the rotatable assemblies 264, they are received between the sprockets with a close fit and are thereby supported by the sprockets. To provide additional support for the lower arms 278, these arms carry adjacent their outer ends rollers 306 which ride along tracks 308 carried by the frame structures 286. Each of the arms 278 carries at its outer end one-half of the lower mold assembly 309 which is generally of the configuration of the mold assembly illustrated in FIGURES 3, 4 and 5 except that it is provided with a lateral extension 310 for a purpose to appear. As in the previously described embodiment, a rubber pad 312 is interposed between the mold element and its supporting arm.

The outer ends of the upper arms 276 are apertured to slidably receive shafts 314 and 316, the lower ends of which are each pivotally connected to an upper mold portion 318 which corresponds essentially to one-half of the upper mold illustrated in FIGURE 3 except that again it is provided with a lateral extension 320 adapted to engage the extension 310 of the lower mold. At their upper ends the shafts 314 and 316 carry cam follower rollers 321 and 322, respectively; the former travelling between upper and lower cam tracks 324 and 326 and the latter travelling between cam tracks 328 and 330, all of the cam tracks being suitably supported by the frame structures 286.

As stated above, the apparatus of FIGURES 14-18 also includes means for performing all of the preliminary treatment operations necessary to prepare the crab carcass for handling by the mold assemblies. These preliminary operations are affected as the crab carcass is transported from a loading station in the region indicated at L in FIGURE 14 to the mold assemblies by a conveyor assembly which comprises pairs of carrier members 332 attached to endless chains 334 which pass around driven and idler sprockets 336 and 338, respectively. The carrier members 332 are provided with inclined tabs 339 which extend upwardly through the space between adjacent stationary platforms 340 and 341. The tabs 339 engage and slightly elevate the rear portion of the crab carcass which is manually positioned to bridge the space between the platforms 340 and 341.

The crab carcass is transported by the carrier members 332 between a pair of fans 342 and 343 provided with flexible blades which remove the knuckles of the crab previously loosened by the cooking operation. The crab is then brought into the path of opposed wedges 344 and 346, the front points 348 of which are so positioned as to engage the carcass of the crab in the proper position to lift the back of the crab from the carcass, the main body portion of the carcass being held down by the lower flat edges of the wedges which ride over the legs and fins which remain on the carriers. The flat lower edges of the wedges are extended laterally and along the line of travel of the carcass to hold the carcass in position for the subsequent operations.

The movement of the carriers 332 is synchronized with the movement of the mold assemblies so that the carriers pass over the sprocket 338 simultaneously with the passage of two of the mold half assemblies in this region. Thus the pre-prepared crab carcasses are delivered smoothly onto the lower mold halves in proper position for the subsequent treatment, i.e. with the body of the crab positioned between the contoured portion of the mold and with the legs or fins resting on the lateral mold extensions.

The cam tracks 324–330 are so arranged as to lift the upper mold assembles 318 to their position of maximum height to facilitate the loading action of the lower molds. The configuration of the succeeding portion of the cam tracks is such as to lower the upper mold to lightly grip the legs or fins between the lateral mold extensions 310 and 320 with sufficient pressure to hold the carcass in place as the molds pass the saw 230 which cuts the carcass along its longitudinal center line.

Then during the passage of the molds around approximately the first 90° of the circumference of the disc assemblies 264, the upper molds are brought down into firm contact with the lower molds so as to extrude the crab meat through the now open center of the crab body. To facilitate this action this squeezing action is initiated in the region of the legs or fins of the crab and progresses toward the center of the crab body where the action is completed. This action is provided by appropriate contours of the cam tracks 324–330 so that the shaft 314 is lowered slightly before the shaft 316. A portion of the crab meat is delivered directly onto the belts 282 or 284. Any portion which adheres to the face of the mold halves may be stripped off by a stationary blade 358 positioned on the frame structure over the conveyor belts 282 and 284.

In the succeeding movement of the mechanism, the upper molds are moved to their fully raised position and the crab carcasses are removed from the lower molds preferably by jets of air delivered through pipes 360 which are positioned opposite chutes 362 which conduct the carcasses to any convenient point of final disposal.

Thus this form of the invention provides for completely automatic treatment of the crab carcasses and for delivery of the crab meat and picked carcasses to suitable points for further treatment.

The invention may be embodied in other specific forms without departing from the spirit or essential characteristics thereof. For example, the upper mold assemblies may be raised and lowered by pnuematic or hydraulic apparatus in lieu of the cam apparatus described above. The present embodiments are therefore to be considered in all respects illustrative and not restrictive, the scope of the invention being indicated by the appended claims rather than by the foregoings description, and all changes which come within the meaning and range of equivalency of the claims are intended to be embraced therein.

What is claimed and desired to be secured by United States Letters Patent is:

1. Apparatus for extracting meat from a cleaned crab carcass comprising a first mold having a concave surface and a ridge extending centrally thereof across a portion of said surface, a second mold having a convex surface and having a groove extending centrally thereof across a portion of said convex surface, and means for bringing said molds together in pressure contact with said groove in registration with said ridge to extrude the meat from a crab carcass positioned between said molds.

2. Apparatus for extruding meat from a cleaned crab carcass comprising a first mold having a concave surface having raised portions at its opposite edges and a ridge extending centrally thereof across a portion of said surface from one of said raised portions toward said other raised portion, a second mold having a convex surface conforming to said concave surface and having a groove extending centrally thereof, and means for bringing said molds together in pressure contact with said groove in registration with said ridge to extrude the meat from a crab carcass positioned between said molds.

3. Apparatus for extruding meat from a cleaned crab carcass comprising a first mold having a concave operating surface shaped generally to the contour of said crab carcass, a second mold having an operating surface shaped generally to the contour of the operating surface of said first mold, the operating surface of said second mold being formed of resilient material, and means for bringing said molds together in pressure contact to extrude the meat from a crab carcass positioned between said molds.

4. Apparatus for extracting meat from a cleaned crab carcass comprising a first mold having an upwardly concave surface shaped generally to the contour of said crab carcass, means for moving said mold with a crab carcass positioned thereon through a working station, a second mold having a convex operating surface shaped generally to the contour of said first mold, and means for moving said second mold into pressure contact with said first mold at said working station to extrude the meat from a crab carcass positioned between said molds.

5. The apparatus according to claim 4 together with means for conveying said crab meat and the stripped carcass separately away from said working station.

6. Apparatus for extracting meat from a cleaned crab carcass comprising a first mold having an upwardly concave surface shaped generally to the contour of said crab carcass, means for moving said mold with the crab carcass positioned thereon through a working station, a second mold having a convex operating surface shaped generally to the contour of said first mold, means for moving said second mold into pressure contact with said first mold at said working station to extrude the meat from a crab carcass positioned between said molds, at least a portion of said meat being deposited on the periphery of said molds and stripper means operable to scrape the extruded meat from the periphery of said molds.

7. Apparatus for extracting meat from a crab carcass comprising conveying means for moving a crab carcass in an essentially linear path, a pair of mold assemblies, each mold assembly comprising a lower portion having a contoured support surface conforming generally to the contour of one lateral half of said crab carcass and an upper portion having a surface complementary to the support surface of said lower portion, means for moving said mold assemblies in side-by-side relation to support a crab carcass on the lower mold portions, said conveying apparatus being operable to deposit a carcass on said lower mold portions, means for bringing the upper mold portions into light pressure engagement with a crab carcass positioned on said lower mold portions to grip said carcass, means for cutting the crab carcass along its longitudinal center while it is gripped by said mold assemblies, means for carrying said mold assemblies to respective working stations and means at each of said working stations to bring the respective upper mold portions into pressure engagement with the associated lower mold portions to extrude the meat from each half of the crab carcass through the open center thereof.

8. Apparatus for extracting meat from a crab carcass comprising conveying means for moving a crab carcass in an essentially linear path, a pair of mold assemblies, each mold assembly comprising a lower portion having a contoured support surface conforming generally to the contour of one lateral half of said crab carcass and an upper portion having a surface complementary to the support surface of said lower portion, means for moving said mold assemblies in side-by-side relation to support a crab carcass on the lower mold portions, means for bringing the upper mold portions into light pressure engagement with a crab carcass positioned on said lower mold portions to grip said carcass, means for cutting the crab carcass along its longitudinal center while it is gripped by said mold assemblies, means for carrying said mold assemblies to respective working stations, and means at each of said working stations to bring the respective upper mold portions into pressure engagement with the associated lower mold portions to extrude the meat from each half of the crab carcass through the open center thereof.

References Cited by the Examiner
UNITED STATES PATENTS

| | | | |
|---|---|---|---|
| 1,985,323 | 12/1934 | McCall | 100—152 |
| 2,019,080 | 10/1935 | Johnson et al. | 53—124 |
| 2,784,447 | 3/1957 | Thompson et al. | 17—2 |
| 2,838,786 | 6/1958 | Ward | 17—2 |
| 2,903,737 | 9/1959 | Ward | 17—45 |
| 2,915,781 | 12/1959 | Woolf et al. | 17—2 |
| 2,978,334 | 4/1961 | Lapeyre | 99—111 |

SAMUEL KOREN, *Primary Examiner.*
LUCIE H. LAUDENSLAGER, *Examiner.*